United States Patent
Neofotistos

(10) Patent No.: US 7,097,764 B2
(45) Date of Patent: Aug. 29, 2006

(54) APPARATUS FOR IRRADIATING FLUIDS WITH UV

(75) Inventor: Paris Neofotistos, Midlothian, VA (US)

(73) Assignee: Infilco Degremont, Inc., Richmond, VA (US)

( * ) Notice: Subject to any disclaimer, the term of this patent is extended or adjusted under 35 U.S.C. 154(b) by 0 days.

(21) Appl. No.: 10/509,717

(22) PCT Filed: Apr. 1, 2003

(86) PCT No.: PCT/US03/10000

§ 371 (c)(1),
(2), (4) Date: Apr. 28, 2005

(87) PCT Pub. No.: WO03/084879

PCT Pub. Date: Oct. 16, 2003

(65) Prior Publication Data

US 2005/0173351 A1    Aug. 11, 2005

Related U.S. Application Data

(60) Provisional application No. 60/369,081, filed on Apr. 1, 2002.

(51) Int. Cl.
*C02F 1/32* (2006.01)
(52) U.S. Cl. .................. 210/192; 210/748; 250/436; 250/438
(58) Field of Classification Search ............ 210/192, 210/243, 748; 250/435–438
See application file for complete search history.

(56) References Cited

U.S. PATENT DOCUMENTS

| 3,637,342 | A | 1/1972 | Veloz |
| 5,124,131 | A | 6/1992 | Wekhof |
| 5,200,156 | A | 4/1993 | Wedekamp |
| 5,885,449 | A | 3/1999 | Bergmann et al. |
| 6,420,715 | B1 | 7/2002 | Cormack et al. |
| 6,500,346 | B1 | 12/2002 | Taghipour et al. |

FOREIGN PATENT DOCUMENTS

JP    2001-212214 A  *  8/2001

OTHER PUBLICATIONS

English Language abstract and machine language translation of JP 2001-212214 A for the Japanese Patent Office.*

* cited by examiner

*Primary Examiner*—Matthew O. Savage
(74) *Attorney, Agent, or Firm*—DLA Piper Rudnick Gray Cary US LLP

(57) ABSTRACT

An apparatus for irradiating fluids with UV including a reactor vessel (10) having a fluid inleT (12), a fluid outlet (14) and a reaction chamber (16); a plurality of UV lamps (18a–d) extending across the reaction chamber (16) and substantially perpendicularly to an axis (A) extending between the fluid inlet (12) and the fluid outlet (14); an upper fluid diverter (22) and a lower fluid diverter (24) extending across the reaction chamber (16) substantially parallel to the lamps (19a–d) and positioned downstream of at least one upstream UV lamp (18a, *b*), wherein the upper and lower fluid diverters (22, 24) are positioned to direct fluids toward at least one UV lamp (18c, *d*) downstream of the upstream UV lamp (18a, *b*).

11 Claims, 5 Drawing Sheets

FIG. 3
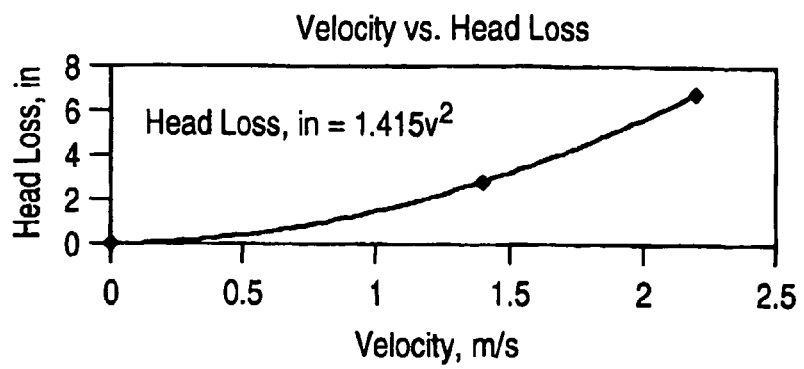
Velocity vs. Head Loss
Head Loss, in = $1.415v^2$
FIG. 4
| | | Particle captured | | | |
|---|---|---|---|---|---|
| | 31.49 | 73.46 | 31.49 | | |
| | 30.23 | 32.72 | 30.23 | | |
| 56.22 | 33.7 | 32.53 | 33.7 | 56.22 | |
| 58.84 | 40.7 | 50.64 | 40.7 | 58.84 | |
| 52.13 | 37.95 | 35.87 | 37.95 | 52.13 | |
| 41.44 | 53.41 | 40.15 | 53.41 | 41.44 | |
| Particle captured | 64.79 | 43.56 | 64.79 | Particle captured | |
| | 28.76 | 24.97 | 28.76 | | |
| | 28.05 | 24.61 | 28.05 | | |
| | | Particle captured | | | |
| |
|---|
| 5-10 |
| 10-15 |
| 15-20 |
| 20-25 |
| 25-30 |
| 30-35 |
| 35-40 |
| 40-45 |
| 45-50 |
| 50-55 |
| 55-60 |
| 60+ |
FIG. 5
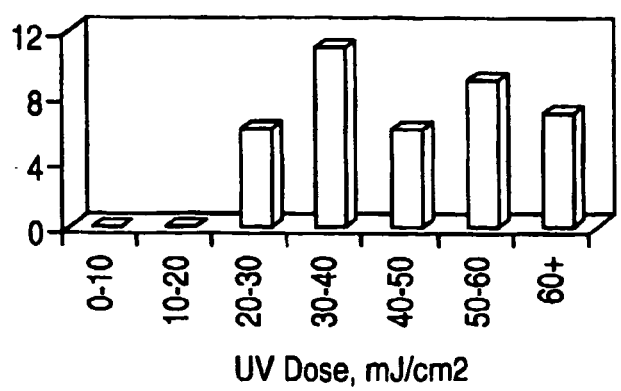
UV Dose Distribution

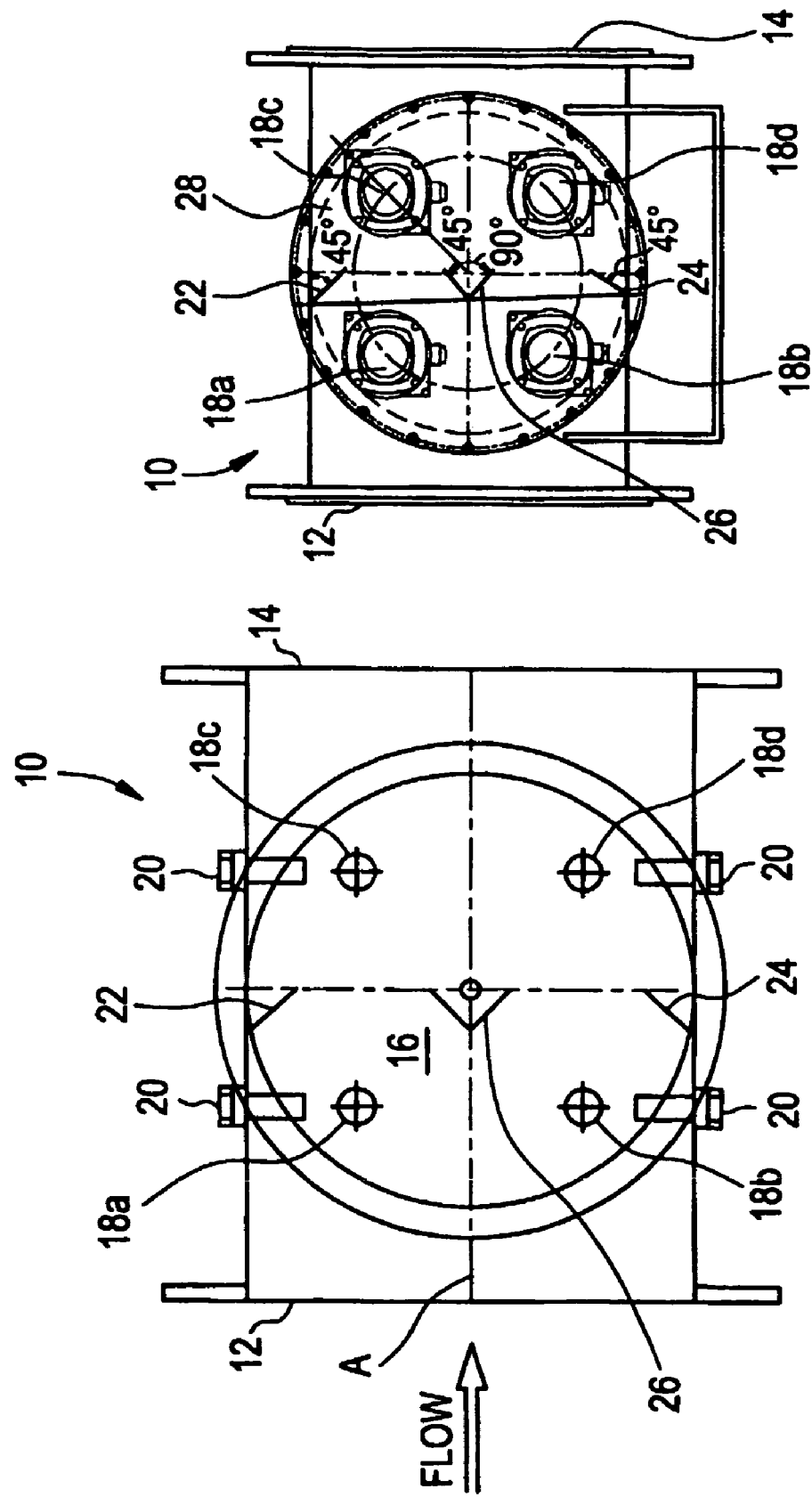

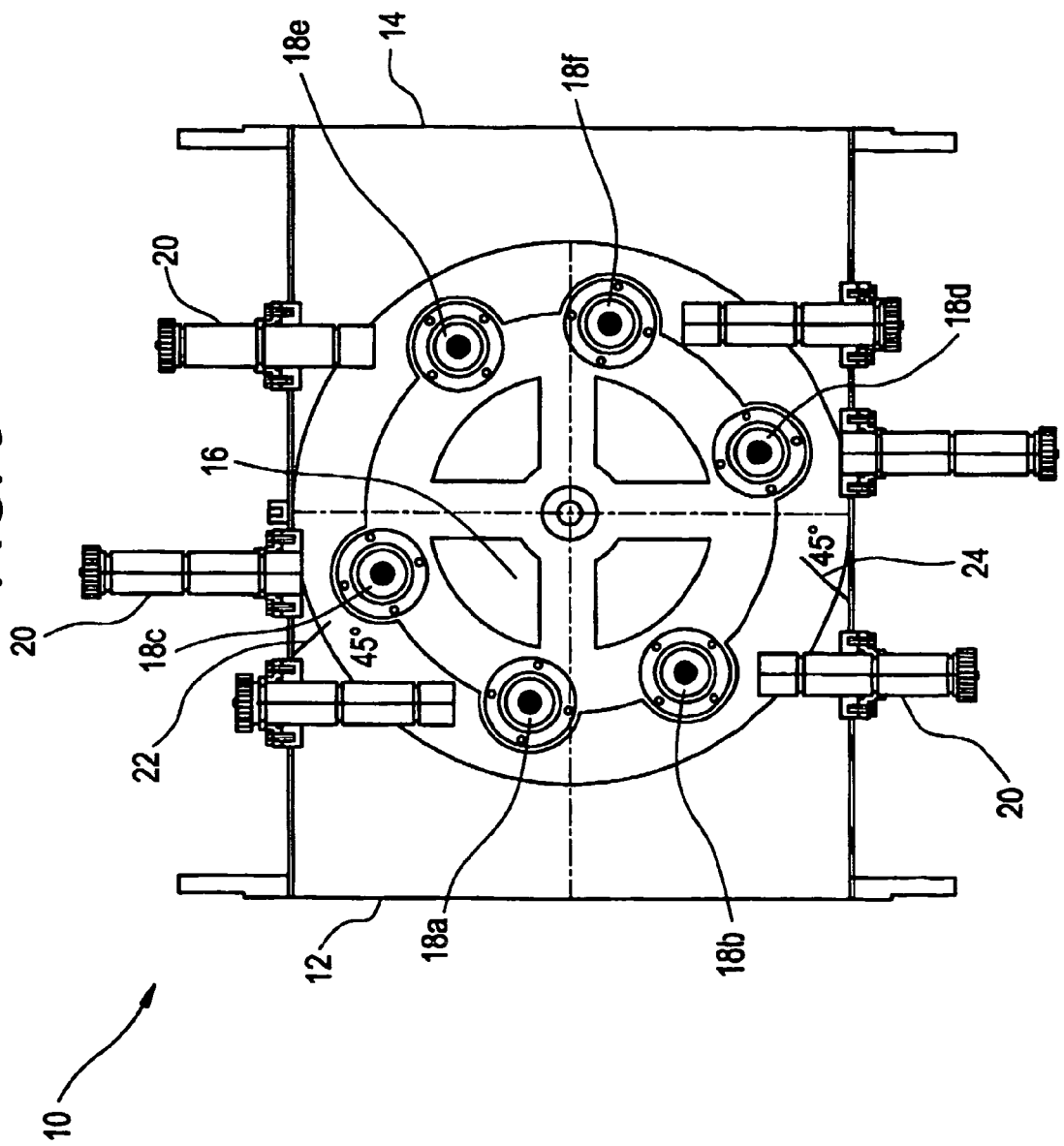

APPARATUS FOR IRRADIATING FLUIDS WITH UV

FIELD OF THE INVENTION

This invention relates to disinfection of fluids with ultraviolet radiation, particularly to a disinfection reactor capable of efficiently irradiating such fluids.

BACKGROUND

Disinfection, as applied in water and wastewater treatment, is a process by which pathogenic microorganisms are inactivated to provide public health protection. Chlorination has been the dominant method employed for disinfection for almost 100 years. However, it is no longer the disinfection method automatically chosen for either water or wastewater treatment because of the potential problems associated with disinfection by-products and associated toxicity in treated water. Ultraviolet (UV) irradiation is a frequent alternative chosen to conventional chlorination. Since UV radiation is a nonchemical agent, it does not yield disinfectant residual. Therefore, concerns associated with toxic disinfectant residuals do not apply. In addition, UV disinfection is a rapid process. Little contact time (on the order of seconds rather than minutes) is required. The result is that UV equipment occupies little space when compared to chlorination and ozonation.

The responses of microorganisms to UV irradiation are attributable to the dose of radiation to which they are exposed. The UV dose is defined as the product of radiation intensity and exposure time. As a result of turbulent flow conditions and three-dimensional spatial variations in UV intensity, continuous-flow UV systems deliver a broad distribution of UV does. Principles of reactor theory can be used to demonstrate that this distribution of doses leads to inefficient use of the UV energy emitted within these systems. Furthermore, the theoretical upper limit on UV reactor performance coincides with a system which accomplishes the delivery of a single UV dose (i.e., a dose distribution which can be represented by a delta function). Optimal dose distribution is difficult to achieve in currently used UV disinfection systems.

An average dose does not accurately describe the disinfection efficiency of a full-scale UV system. UV intensity is a function of position. The intensity of UV radiation decreases rapidly with distance from the source of radiation. Exposure time is not a constant either. The complex geometry of UV systems dictates complex hydrodynamic behavior as well, with strong velocity gradients being observed. Coincidentally, fluid velocity is generally highest in areas of lowest intensity. This creates a situation in which some microorganisms are exposed to a low UV intensity over a comparatively short period of time, thereby allowing them to "escape" the system with a relatively low UV dose. This represents a potentially serious process limitation in UV systems. For example, if 1% of the microorganisms received doses lower than the lethal level, then the maximum inactivation achievable by the system is 99%, no matter what actual average dose was delivered.

Non-uniform distribution of UV doses in systems indicates that UV radiation is applied inefficiently. While UV overdose apparently presents no danger in terms of finished water composition, it does increase operating and capital costs. Therefore, it is desirable to have a system which incorporates the effects of hydrodynamic behavior and the UV intensity field to provide for complete disinfection.

Mathematical modeling of UV reactors has been used to improve reactor design and predict microbial inactivation. Do-Quang et al (1997) discussed the use of CFD modeling of a vertical lamp open channel UV reactor to improve microbial inactivation. Blatchley et al (1997) proposed a method of particle tracking for calculating the dose distribution in an open channel horizontal lamp UV reactor. That model took into consideration both the hydrodynamics of the system and the intensity field.

The above models were based on low-pressure lamp systems installed in wastewater that have a single germicidal wavelength output at 254 nm. CFD modeling is helpful in assessing reactor design with in-line drinking water reactors since the hydraulic residence time in these systems is less than about 1 second and the spacing between lamps is larger and non-uniform in comparison to most low-pressure lamp wastewater systems.

SUMMARY OF THE INVENTION

This invention relates to an apparatus for irradiating fluids with UV including a reactor vessel having a fluid inlet, a fluid outlet and a reaction chamber, a plurality of UV lamps extending across the reaction chamber and substantially perpendicularly to an axis extending between the fluid inlet and the fluid outlet, an upper and a lower fluid diverter extending across the reaction chamber substantially parallel to the lamps and positioned downstream of at least one upstream UV lamp, wherein the upper and lower fluid diverters are positioned to direct fluids toward at least one UV lamp downstream of the upstream UV lamp.

BRIEF DESCRIPTION OF THE DRAWINGS

FIG. 3 is a graph showing head loss through one reactor versus flow rate.

FIG. 4 is a schematic showing the UV dose received by the 39 particles at the outlets of a closed reactor.

FIG. 5 is a graph showing the UV dose distribution at 6.27 MGD and 0.046/cm water absorbance.

FIG. 6 is a side elevational view of a closed UV reactor in accordance with aspects of the invention, partly taken in section.

FIG. 7 shows further detail of the UV reactor of FIG. 6 with respect to UV lamps contained therein.

FIG. 9 is a side elevational view of another UV reactor, also partially taken in section, in accordance with aspects of the invention.

DETAILED DESCRIPTION

Figure 1:
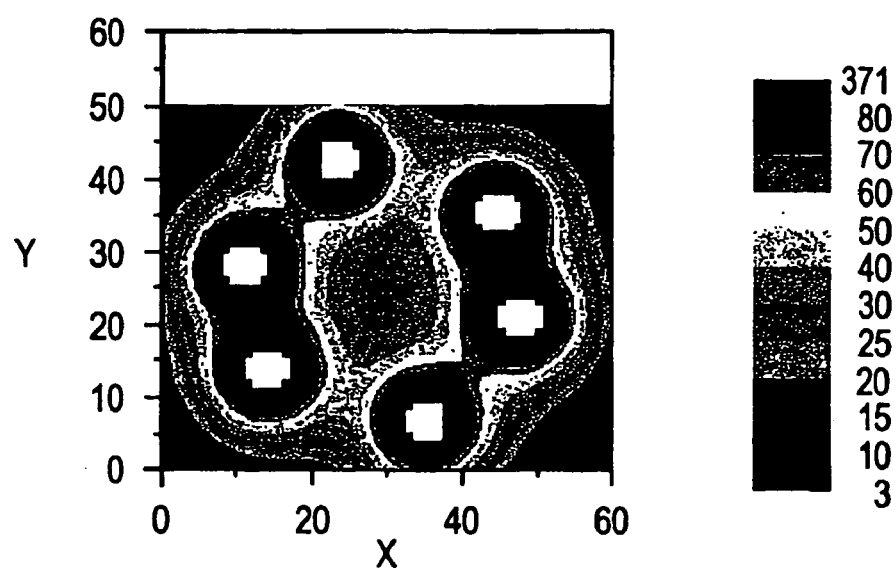
FIG. 1 is a schematic view of fluence rate distribution (in mW/cm') of a 20-inch reactor at 90% UVT.

It will be appreciated that the following description is intended to refer to specific embodiments of the invention selected for illustration in the drawings and is not intended to define or limit the invention, other than in the appended claims.

CFD can be used as a design tool to improve microbial inactivation while minimizing head loss in the reactor. Head loss is important in UV drinking water reactors since most UV systems in a water plant are located downstream of filtration and before clearwell where there is little head to spare. Low head loss allows a UV reactor to be installed in more water plants without the need for modifications such as adding pumps or lowering the level of the clearwell leading to other issues such as the reduction of CT.

Figure 8:
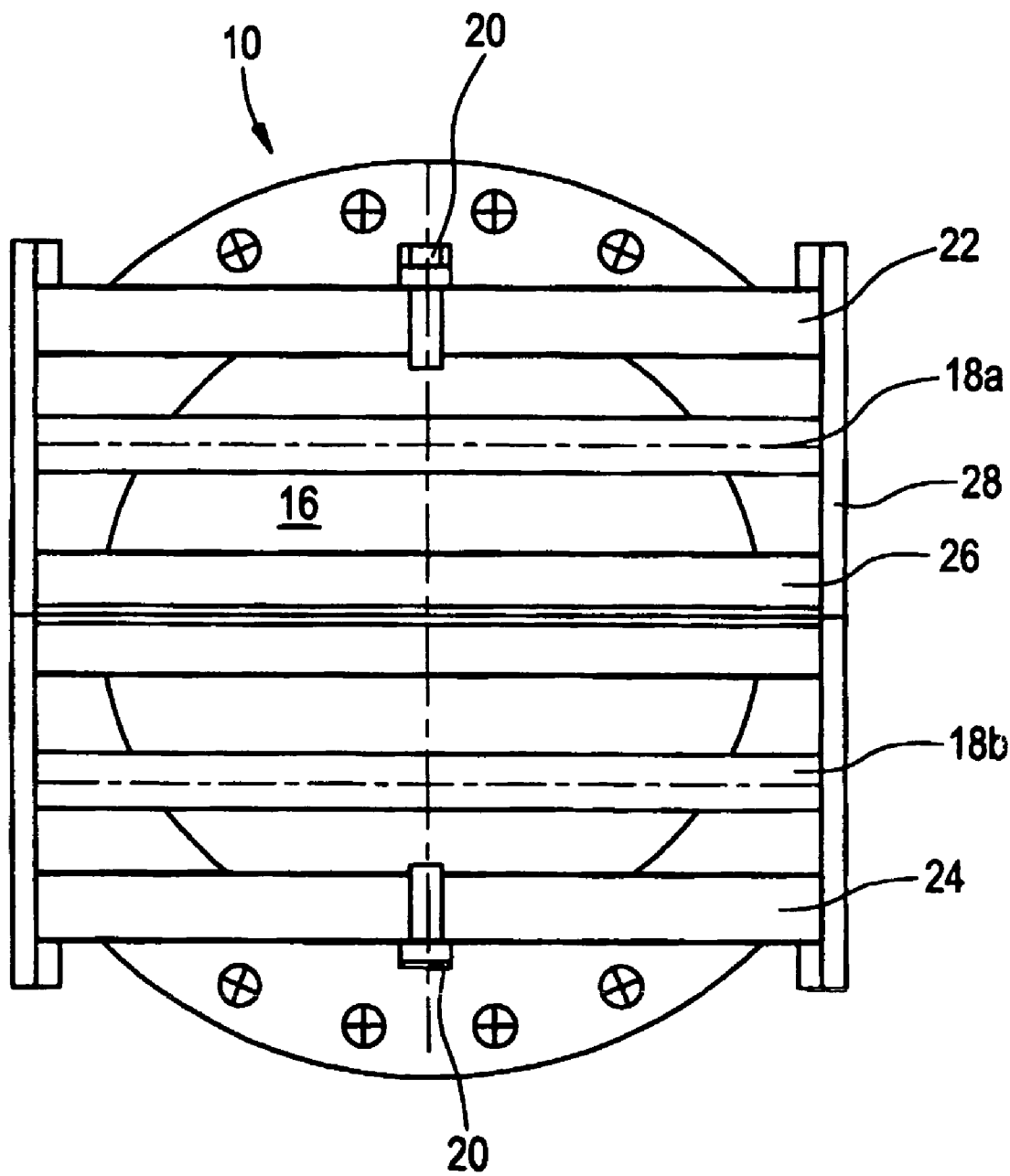
FIG. 8 is a front elevational view, taken partially in section of the UV reactor of FIG. 6.

A closed UV reactor 10 is shown in FIGS. 6–8. The reactor includes a fluid inlet 12, a fluid outlet 14 and a reaction chamber 16. The fluid inlet 12, fluid outlet 14 and reaction chamber are substantially round in shape, although other shapes such as oval, for example, can be used. Four UV lamps 18 extend substantially parallel to one another and, as especially shown in FIGS. 6 and 7, are arranged to form the four corners of a square. The lamps 18 also are positioned substantially perpendicularly to axis A extending between inlet 12 and outlet 14. Each UV lamp 18 is surrounded by and sealed within a quartz jacket (not shown), the structure and arrangement of which is well known to those of ordinary skill in the art.

A UV sensor 20 is positioned adjacent each UV lamp to accurately assist in the detection and determination of UV emissions from the respective UV lamps.

An upper fluid diverter 22 is located in the reaction chamber and oriented at about a 45° angle out of horizontal. A lower fluid diverter 24 is similarly positioned at the bottom of the reaction chamber 16. Lower diverter 24, in this case, is located substantially vertically below upper diverter 22. An L-shaped center diverter 26 is positioned halfway between upper and lower diverters 22 and 24 and, in this case, is positioned vertically below upper diverter 22 and above lower diverter 24. The L-shape of diverter 26 is formed by a pair of legs angled at about 90° with respect to one another. Each leg is angled about 45° out of horizontal. The diverters 22, 24 and 26 are positioned downstream of at least one of the upstream UV lamps and are further positioned to direct fluids towards at least one UV lamp downstream of the upstream UV lamp. There is no particular need or benefit to placing diverters (or other obstructions) upstream of or at the location of the upstream UV lamp(s). Thus, in this case, lamps 18A and B are upstream lamps and lamps 18C and D are downstream lamps.

Referring specifically to FIG. 7, a reactor end plate 28 is sealed to UV reactor 10 and is utilized to position the lamps 18 and diverters 22, 24 and 26 in the desired location. Sensors 20 are positioned substantially vertically oriented with respect to each other and are also aligned in the upstream to the downstream direction to provide consistency in UV data collected by the respective censors.

FIG. 9 shows another embodiment that employs six lamps 18, lettered "A–F", as preceding from upstream to downstream. UV reactor 10 of FIG. 9 also includes a fluid inlet 12 and fluid outlet 14 and a reaction zone 16. Reactor 10 also includes diverters 22 and 24, but not 26 in this case. As in the other embodiment, diverters 22 and 24 are preferably angled at about 45° out of horizontal to effectively divert fluids toward a UV lamp located nearest the uppermost and lowermost portions of reaction chamber 16, respectively. Sensors 20 are positioned to detect UV from each of the lamps 18.

As shown in FIGS. 7 and 9, the plurality of UV lamps are arranged in a substantially circular array such that at least two of the lamps (18a, 18c in FIG. 7, and 18a, 18c, and 18e in FIG. 9) are located above the horizontal axis and at least two of the lamps (18b, 18d in FIG. 7, and 18b, 18d, and 18f in FIG. 9) are located below the horizontal axis, and such that two of the lamps 18a, 18b located closest to the fluid inlet 12 are upstream lamps and remaining ones of the lamps (18c–18d in FIG. 7, and 18c–18f in FIG. 9) are downstream lamps.

Figure 2:
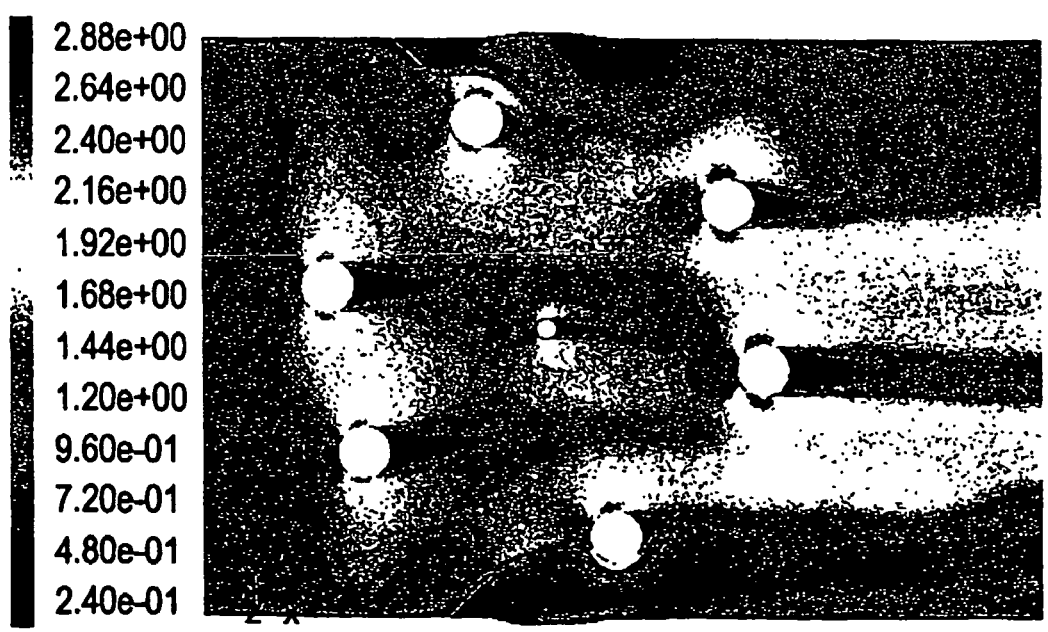
FIG. 2 is a schematic view of a model at 1.4 m/s entry velocity at the cross-section 5 cm from the reactor centerline of a closed reactor.

The fluence rate distribution in a 6-lamp reactor layout (FIG. 9) is shown in FIG. 1. As described earlier, the intensity in the reactor decreases rapidly with distance from the source of radiation and is non-uniform. In order to eliminate high fluid velocities in low areas of UV intensity, CFD experiments were conducted as shown in FIG. 2. As can be seen in FIG. 2, the deflectors in the reactor direct the flow from the low intensity areas along the reactor wall into the high intensity areas near the UV lamps. These deflectors in the reactor result in a narrow calculated dose distribution with no low UV dose areas evident as shown in FIG. 5. Also, there are no significant overdose areas evident in the reactor resulting in energy inefficiency. One of the drawbacks of baffles or deflectors is that they increase the head loss in the system. The deflectors herein provide the benefit of eliminating the low dose areas in the reactor while minimizing the cross-sectional area they take up in the reactor. This deflector design led to the minimal head loss in the 6-lamp reactor as shown in FIG. 3.

Although this invention has been described in connection with specific forms thereof, it will be appreciated that a wide variety of equivalents may be substituted for the specified elements described herein without departing from the spirit and scope of this invention as described in the appended claims.

For example, reactor 10 can be made from a wide variety of materials, both ferrous and non-ferrous, so long as they provide the appropriate strength, corrosion and UV resistance characteristics. Stainless steel is especially preferred. A wide variety of UV lamps, quartz jackets and devices to seal the lamps with respect to the jackets may also be employed. Sensors of varying types can be used as conditions merit. Also, the materials used for the diverters can vary as appropriate, so long as they are sufficiently strong, have appropriate corrosion and UV resistance. Although angles out of horizontal of about 45° are especially preferred, other angles may be employed to suit specific positioning of UV lamps 18. Angles less than 90° are preferred.

Although we have selected two embodiments for illustration that contain four and six lamps, other numbers of lamps can be utilized, either more or less. Especially preferred alternatives include two-lamp reactors and eight-lamp reactors, although more could be employed as warranted. As noted above, variations on the number of lamps, angles of placement of the diverters and the like should be carefully selected to ensure that head loss characteristics are maintained as desired.

What is claimed is:
1. An apparatus for irradiating fluids with UV comprising:
a reactor vessel having a fluid inlet, a fluid outlet and a reaction chamber;
a plurality of UV lamps extending horizontally across the reaction chamber and substantially perpendicular to a horizontal axis extending between the fluid inlet and the fluid outlet, wherein said plurality of UV lamps are arranged in a substantially circular array such that at least two of said lamps are located above said horizontal axis and at least two of said lamps are located below said horizontal axis, and wherein two of said lamps located closest to said fluid inlet are upstream lamps and remaining ones of said lamps are downstream lamps;
an upper fluid diverter positioned above said lamps and a lower fluid diverter positioned below said lamps, said upper and lower diverters extending across the reaction chamber substantially parallel to said lamps and positioned such that all diverters are downstream of the upstream UV lamps, and wherein the upper and lower fluid diverters are positioned to direct fluids toward the uppermost and lowermost ones of the downstream lamps, respectively.

2. The apparatus according to claim 1, wherein the upper and lower fluid diverters are positioned at an angle of about 45° from horizontal.

3. The apparatus according to claim 1, wherein the lower fluid diverter is positioned substantially vertically below the upper fluid diverter.

4. The apparatus according to claim 1, further comprising an L-shaped center fluid diverter positioned substantially halfway between the upper and lower fluid diverters.

5. The apparatus according to claim 4, wherein the center fluid diverter has a pair of legs and is positioned such that the legs are at an angle of about 45° from horizontal.

6. The apparatus according to claim 1, wherein the reaction chamber contains four UV lamps.

7. The apparatus according to claim 1, further comprising a UV sensor extending into the reaction chamber and for each UV lamp.

8. The apparatus according to claim 1, wherein the reaction chamber contains six UV lamps.

9. The apparatus according to claim 8, wherein the upper fluid diverter diverts fluid toward an uppermost UV lamp and the low fluid diverter diverts fluid toward a lowermost UV lamp.

10. The apparatus according to claim 1, wherein the upper and lower fluid diverters are positioned at an angle less than 90° from horizontal.

11. An apparatus for irradiating fluids with UV comprising:
a closed, substantially circularly-shaped reactor vessel having a fluid inlet, a fluid outlet and a reaction chamber;
a plurality of UV lamps extending substantially horizontally across the reaction chamber and substantially perpendicularly to a horizontal axis extending between the fluid inlet and the fluid outlet, wherein said plurality of UV lamps are arranged in a substantially circular array such that at least two of said lamps are located above said horizontal axis and at least two of said lamps are located below said horizontal axis, and wherein two of said lamps located closest to said fluid inlet are upstream lamps and remaining ones of said lamps are downstream lamps;
an upper fluid diverter positioned above said lamps and a lower fluid diverter positioned below said lamps, said upper and lower diverters extending substantially horizontally across the reaction chamber substantially parallel to said lamps and positioned such that all diverters are downstream of the upstream UV lamps, and wherein the upper and lower fluid diverters are positioned to direct fluids toward the uppermost and lowermost ones of the downstream lamps, respectively.

\* \* \* \* \*